United States Patent [19]

Johnson et al.

[11] Patent Number: 4,822,994
[45] Date of Patent: Apr. 18, 1989

[54] SMALL ARMS SIGHT FOR USE DURING DAYLIGHT AND NIGHTTIME CONDITIONS

[75] Inventors: Charles B. Johnson, Ft. Wayne, Ind.; Francis J. Augustine, Fairfax, Va.

[73] Assignee: ITT Electro Optical Products a Division of ITT Corporation, Roanoke, Va.

[21] Appl. No.: 99,926

[22] Filed: Sep. 23, 1987

[51] Int. Cl.⁴ .......................... H01J 31/50; F41G 1/38
[52] U.S. Cl. ............................... 250/213 VT; 33/250; 33/245; 350/1.2
[58] Field of Search .................. 250/213 VT, 330; 33/233, 234, 250, 261, 245; 350/1.2; 356/247

[56] References Cited

U.S. PATENT DOCUMENTS

| | | | |
|---|---|---|---|
| 2,946,255 | 7/1960 | Bolay | 350/1.2 |
| 3,392,450 | 7/1968 | Herter et al. | 33/261 |
| 3,971,933 | 7/1976 | Adamson, Jr. | 250/213 VT |
| 4,241,252 | 12/1980 | Litman | 250/213 VT |
| 4,255,013 | 3/1981 | Allen | 356/247 |
| 4,341,022 | 7/1982 | Santoro | 33/250 |
| 4,440,476 | 4/1984 | Jacobson | 250/213 VT |

Primary Examiner—Edward P. Westin
Attorney, Agent, or Firm—Robert A. Walsh; Thomas N. Twomey; Mary C. Werner

[57] ABSTRACT

There is disclosed a small arms sight assembly which enables a firearm such as a revolver or rifle to be employed for both nighttime and daytime use. The gun sight assembly includes a typical telescopic sight assembly of a conventional design which sight assembly includes an image intensifier module which can be selectively removed from the telescopic sight. The intensifier module or assembly when employed in conjunction with the remaining sight components enables the user to operate the weapon under low light conditions. During daytime operation the intensifier module housing section is removed. In this manner there is described a sight which enables a small weapon to be employed for daytime or nighttime use while providing increased effective weapon range when compared to conventional sight devices.

12 Claims, 1 Drawing Sheet

SMALL ARMS SIGHT FOR USE DURING DAYLIGHT AND NIGHTTIME CONDITIONS

This invention was made with Government support under Contract No. DAAK10-84-C-0246 awarded by the Department of the Army. The Government has certain rights in this invention.

BACKGROUND OF THE INVENTION

This invention relates to gunsights in general and more particularly to a gun sight which can be employed for either nighttime or daytime operation and which is particularly adaptable for small arms such as rifles, pistols and so on.

As one can ascertain, the prior art is replete with various devices generally designated as sights. In general a sight is utilized for aiming a gun at a directly visible target. In order to aim a gun some form of sighting device is required Such devices range from simple front and rear sights like those on an ordinary rifle to complex fire control systems for large guns. The sighting device may move with the gun barrel or may be separate from the gun elevating mechanisms. In general the use of such sighting devices in guns is well known.

There are other devices which further enhance the ability of the user to aim the gun such as telescopic sights and other sighting devices which may be utilized during nighttime operations. As indicated, the prior art is replete with a number of devices of various types and natures which assist the user of a weapon to aim the same. As indicated, certain sophisticated sighting devices such as telescopes are utilized to magnify a target and to enable the user during normal daytime operation to achieve a magnification of the area or target area at which he is aiming. There are also nighttime vision devices or sights which employ image intensifiers or similar structures.

The function of an image intensifier is to multiply the amount of incident light received by it to produce a greater signal for application to the eyes of a viewer. As such, these devices have been employed by the military and in commercial devices as well. Examples of early uses of such devices can be had by reference to a text entitled "Photoelectricity and Its Applications" published in 1949 by John Wiley & Sons. Chapter 18 entitled "Light Beam Signalling and Infrared Detection" shows examples of early nighttime vision device which may be employed as gun sights such as the Sniperscope and Snooperscope.

In any event, it would be desirable to provide a universal gun sight which can be employed on small hand held firearms such as a single shot, semiautomatic and automatic rifles as well as pistols. The small arms sight system to be described hereafter replaces conventional iron sights as open sights and peep sights as well as conventional telescopic sights which are used on a host of such small weapons. It is desirable to provide a universal gun sight for a hand held firearm which gun sight will enable one to aim the gun during nighttime or daytime ambient conditions.

As indicated, there exists in the prior art small arms sight systems which utilize telescopic means for providing sighting on a gun. These systems cannot be used during a lower light level or nighttime conditions. There are further sights as for example those used by the military which are large, heavy and bulky and are not an integral part of the weapon as will be described.

Hence it is a desire of the present invention to modify the design of a conventional optical telescope sight to utilize an image intensifier to with sufficient optical gain so that the sight can be employed under nighttime or daytime ambient illumination conditions.

The sight is designed in such a manner that the image tube module or intensifier tube can be easily removed. In this manner the system can be quickly and conveniently modified to operate under both daytime and nighttime conditions. The particular mounting of the system enables it to be mounted in a mechanical housing which is an integral part of the weapon receiver. This mounting technique thereby eliminates problems of misalignment between the weapon base and the telescopic sight.

It is, therefore, an object of the present invention to provide a sight structure for a small weapon which enables the weapon to be utilized during daytime and nighttime operations while providing increased effective weapon range when compared to conventional sighting systems for such firearms.

BRIEF DESCRIPTION OF THE PREFERRED EMBODIMENT

A sight apparatus for use in conjunction with firearms to enable a user of said firearm to operate the same during daylight as well as low light or nighttime conditions. The apparatus includes a housing comprising a first housing section and a second housing section, said first housing section having at one end a port for receiving light and having first coupling means at the other end. The line second housing section has a port at one end for viewing received light via the eye of a user and has second coupling means at the other end. The first and second coupling means are adapted to enable the coupling of said first section to said second section and to enable the selective separation of said first section and second section, said sections accommodating a telescopic lens assembly positioned between said ports within said housing to enable a user to obtain an increased visual angle when viewing said received light during daytime conditions. An image intensifier module housing has an internal hollow for accommodating an image intensifier means, said module housing having first coacting coupling means on one end to enable said one end to selectively couple to said first coupling means of said first housing section and second coacting coupling means on said other end to enable said module housing to selectively couple to said second coupling means of said second section, whereby said image intensifier module can be selectively coupled between said first and second sections to enable said user to view images at said increased visual angle during nighttime operation.

DETAILED DESCRIPTION OF THE DRAWINGS

Figure 1:
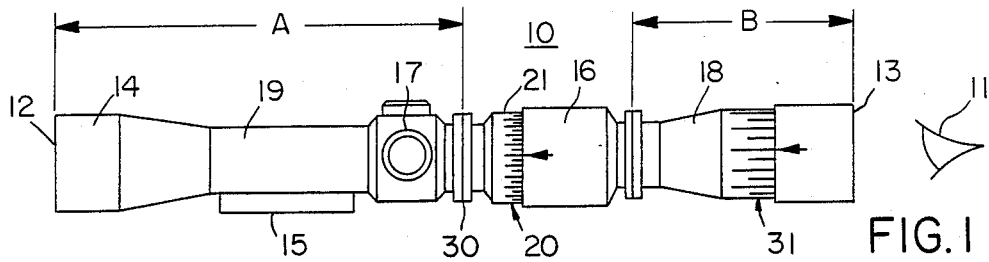
FIG. 1 is a side plan view of a small arms sight according to this invention and particularly employed for nighttime use.

Referring to FIG. 1, there is shown a sight system 10 according to the teachings of this invention.

The system depicted in FIG. 1 illustrates the eye of a user which is designated by the reference numeral 11 in order to show clearly the direction of sighting employed.

As seen in FIG. 1, the sight 10 consists of a front or first housing section A and a rear or second housing section B. The sections A and B can be directly coupled to one another (FIG. 2) or can accommodate an image intensifier module 16. The sections A and B contain the optics necessary to provide a telescope sight assembly.

As is known, all refracting telescopes comprise an objective lens which is directed towards the object to be observed and an ocular lens (eyepiece) to which an observer applies his eye. The rays coming from a distant object are almost parallel and are converged to form an image at the focus of the objective. Telescopes are well known as such devices used for gun sights. Hence, in FIG. 1, section B would contain an ocular lens means and section A would contain the objective lens means.

As one can ascertain from FIG. 1, the entire sighting arrangement basically consists of a tubular assembly having an output port 12 (Section A) for receiving light from various objects and an input port 13 (Section B) for accommodating the eye of a user. Hence, the system allows a user to view through input port 13 object images which are directed from the output port 12. Essentially, the sight 10 appears as a conventional telescopic sight and includes the features of prior art sights as will be further explained.

Integrally formed as part of the sight assembly is a front end portion 14 which includes a suitable lens arrangement. This is employed in conjunction with other lens assemblies to provide telescopic action for the entire sight arrangement 14. Located and integrally formed with the front section 14 is an extending section 19. The section 19 is a longitudinal tubular member having a central aperture and is coupled to a windage and elevation control module 17 which is selectively coupled to an image intensifier module 16 via coupling means 30. Positioned about the wall of the module 16 on the inside thereof is a high voltage power supply which is powered by a battery 15 which battery is positioned beneath the circular housing section 19. The battery 15 may be a conventional three volt battery or a similar type of battery. High voltage power supplies for example as employed in this invention are widely known and consist of a suitable transistor operating as an oscillator which transistor is coupled to a high voltage transformer whereby the effective amplitude of oscillations which are normally determined by the value of the battery 15 are then increased in voltage by the turns ratio of the transformer to produce a high voltage signal which high voltage signal is utilized to bias the image intensifier tube which is contained in section 16. Such image intensifier tubes are extremely small and compact and have been utilized in a host of nighttime vision devices. For examples of suitable tubes and availability see for example U.S. Pat. No. 4,202,601 entitled TRAINING AID FOR USE WITH NIGHTTIME VISION APPARATUS issued on May 13, 1980 to J. H. Burbo et al and assigned to the assignee herein.

In that particular patent there is given many examples of image intensifier devices which can be employed in conjunction with the module 16. Such devices may contain a microchannel plate which consists of a thin glass plate with an array of microscopic holes therethrough. Each hole is capable of acting as a channel type secondary emission electron multiplier. The plate when positioned in the plane of the electron image in an intensifier tube makes it possible to achieve extremely high gains during nighttime operation.

The tube employed can be considered to be an array of photomultipliers and as such is a vacuum tube equivalent of semiconductor large scale integration. For an example of other types of image intensifier devices reference is also made to a text entitled REFERENCE DATA FOR RADIO ENGINEERS (ITT HANDBOOK) published by Howard W. Sams & Co., Inc., a subsidiary of International Telephone and Telegraph Corp. See for example page 17-37 entitled "Light Sensing Tube". In the present state of the art such image intensifier tubes are relatively small devices and, as indicated above, require high voltage for operation.

As one can ascertain from FIG. 1, the image intensifier tube is located within a separate and removable housing 16. The housing 16 as will be explained is removeably coupled between sections A and B of the gun sight so that the gun sight can be rapidly adapted for daytime or nighttime operation. It is again indicated that the sight shown in FIG. 1 is depicted in a nighttime mode whereby the image intensifier contained in module 16 or housing 16 is placed in position. As indicated, the tube module or section 16 is simply inserted between the front A and rear sections B of the telescopic sight 10. The tube module 16 contains a wrap around section which is located internally to the hollow and which wrap around section contains the above-described high voltage power supply. The power supply again is energized by means of the battery 15 which is located upon the front tubular portion 19 of the section A.

The housing section 16 which contains the image intensifier tube is also associated with a gain scale mechanism 20. The gain scale mechanism 20 as shown in FIG. 1 comprises a rotatable section 21 which section 21 is directly coupled to a potentiometer in order to vary the gain of the image of the intensifier tube by means of conventional or well known circuitry. Hence, in this manner the user, by rotating the section 21, can now achieve variable gain during nighttime operation. Also included within the telescopic sight is a windage and elevation module 17.

As one will ascertain, the path of a projectile fired from any weapon is affected by wind and elevation conditions. Such wind and elevation adjustment means are conventional components associated with many small arm sighting systems. The entire module 17 is a well known module and is an integral part of this particular sight. As seen, there are means for coupling the image intensifier section 16 to the section 17. These means are generally designated by reference numeral 30 and may consist of a plurality of well known coupling means.

Essentially, as shown, the image intensifier module may be associated with an outer flange which coacts with a suitable flange positioned on the windage and elevation module 17. These flanges can be secured together by means of threaded members, suitable connecting arrangements and so on. It should be apparent that there are many means available for securing the module 16 to module 17 which include means for easily removing module 16.

Also shown in FIG. 1 is a section 18 which is associated with a telescopic lens assembly. For example, section 18 may contain the additional lenses required for the sight to perform telescopic operation and may be associated with a zoom assembly located within the section 18. Also shown in FIG. 1 is a rotatable or adjustable scale mechanism 31 which is associated with the zoom assembly and enables one to adjust the magnification or zoom factor. Zoom lens assemblies as well as telescopic lens assemblies for gun sights are well known.

It should become apparent when viewing FIG. 1 that the image intensifier module 16 is removeably secured to section 18 and section 17. The means for securing the tube module 16 to the appropriate sections as 17 and 18 are well known and one skilled in the art can envision a host of different means of providing such mechanical coupling.

Figure 2:
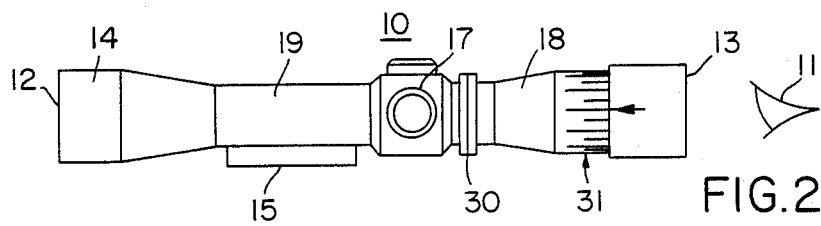
FIG. 2 is a schematic side plan of the sight shown in FIG. 1 employed for daytime use.

As shown in FIG. 2, the sight 10 is now adapted for daytime use. As one can ascertain, FIG. 2 utilizes the same exact reference numerals as those described in conjunction with FIG. 1. It would be immediately apparent that the difference between the two Figures is that in FIG. 2 the tube module assembly 16 is removed, and hence there is no image intensification afforded with the sight in FIG. 2. The operation of the sight in FIG. 2 is strictly for daytime use. It is, of course, apparent that the optical system employed in regard to the telescopic assembly is adjusted for daytime operation due to the fact that the removal of the module 16 reduces the effective length of the sight. This can easily be accommodated for, for example by varying the scale 31 to essentially focus the particular assembly as desired. Means for focusing telescope sighting assemblies are well known in the art.

It is also noted that the same exact coupling technique which couples the housing 16 to section 17 as well as to section 18 enables one to therefore couple section 18 directly to section 17 as both sections employ the same exact coupling mechanism which is represented by the extending flange section 30.

Figure 3:
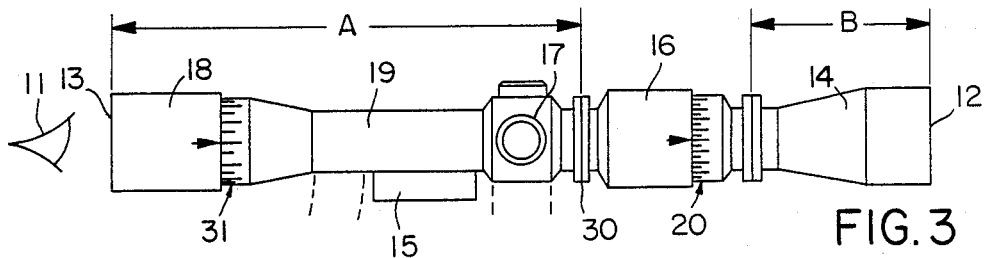
FIG. 3 shows an alternate embodiment of a small arms gun sight employed for nighttime use.

Referring to FIG. 3, there is shown an alternate embodiment of the above-noted gun sight as for example shown in FIGS. 1 and 2. As one can ascertain from FIG. 3, the difference between the configurations is that the intensifier tube module housing 16 is now located between the windage and elevation module 17 and the output telescopic assembly 14.

Figure 4:
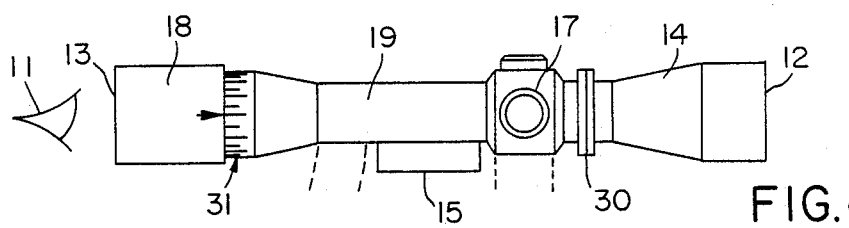
FIG. 4 shows the gun sight of FIG. 3 as employed for daytime use.

FIG. 4 shows the removal of the image intensifier tube module 16 adapting the particular gun sight of FIG. 3 for daytime operation.

Figure 5:
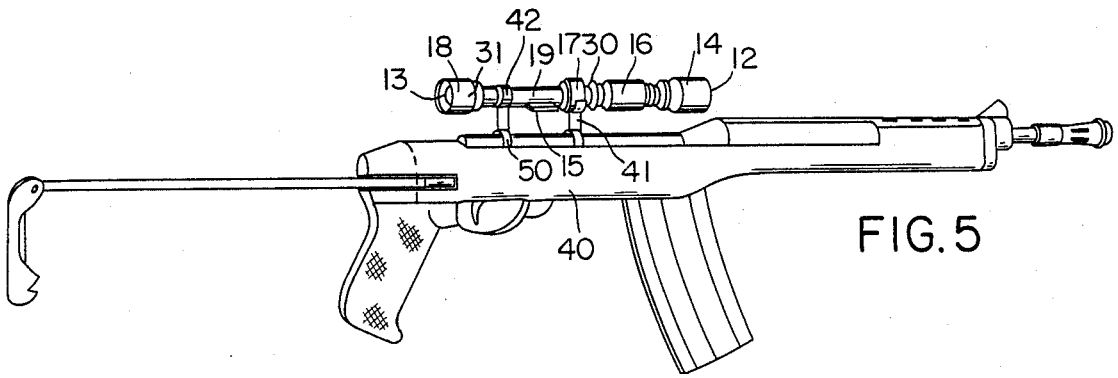
FIG. 5 is a schematic diagram showing a complete rifle having a gun sight assembly according to the teachings of this invention mounted thereon.

FIG. 5 shows a schematic diagram showing the above-noted gun sight employed for nighttime operation and positioned on a small weapon such as a semiautomatic rifle 40. Essentially, the entire sight is held in position by means of two coupling brackets 41 and 42. The bracket 42 is secured to the barrel of the gun by means of a conventional clamping arrangement 50' which encircles the support section 19 which contains the battery 15. It is indicated that support section 19 is a tubular housing section which essentially operates to separate the telescopic lenses by a suitable distance in order to provide telescopic operation.

The windage and elevation module 17 again is secured in position by means of the bracket 41 which is basically of the same configuration as bracket 42. As one can ascertain, the brackets as 41 and 42 are conventional mounting means. Thus, as seen in FIG. 5, based on the coupling scheme utilized at section 30, one can remove the image intensifier housing section 16 very conveniently and hence couple section 14 directly to section 17 for daytime use. It is, of course, understood that when the tube module is removed, the tube module may be stored in a small compartment in the gun stock or elsewhere as for example in a small carrying pouch when it is not being employed.

It is also noted that the entire sight as described above is designed for variable magnification which is implemented by means of the zoom lens assembly in both day and nighttime configurations. The entire rifle complete with the sighting system is shown in FIG. 5.

It is also noted that the battery 15 may be contained directly on the rifle or on the scope and this is strictly according to the preferences of the user. In any event, as indicated, the above-noted device consists of conventional components which enable one to include or remove an image intensifier tubular module assembly to adapt a small arm such as the rifle of FIG. 5 for use during day or nighttime conditions. All of the above-noted modules are available in the prior art and are available from many sources of manufacture. The coupling scheme which enables one to selectively remove or place the image intensifier module in the sight assembly can be implemented by a host of various devices. It should be clearly understood that the major concept of this invention is to provide a telescopic sight assembly which can be adapted for day or nighttime use with a minimum of effort thereby greatly enhancing the operating characteristics of small arms in regard to sighting techniques. It should be obvious to those skilled in the art that there are many modifications and alterations which can be implemented which are deemed to be part and parcel of the above-noted invention and as described by the claims appended hereto.

We claim:

1. A sight apparatus for sue in conjunction with firearms to enable a user of the firearm to operate the same during daylight as well a low light or nighttime conditions, comprising:

a first housing section having a first end and a second end, a port for receiving light located at said first end and first coupling means located at said second end;

a second housing section having a third end and a fourth end, second coupling means located at said third end and a port located at said forth end for viewing received light via the eye of a user;

a lens assembly positioned in at least one of said first and said second housing section for increasing the visual angle when viewing said received light during daytime conditions; and an image intensifier module housing having an internal hollow for accommodating an image intensifier means to enable said user to view images at said increased visual angle during nighttime operation, said image intensifier module having two opposed ends, first coacting coupling means located at one of said opposed ends and second coacting coupling means located at the other of said opposed ends, wherein in a first arrangement said first coupling means is selectively coupled directly to said second coupling means for operation in daylight conditions and in a second arrangement said first coupling means is selectively coupled to said first coacting coupling means and said second coacting coupling means is coupled to said second coupling means for operation in nighttime conditions.

2. The sight apparatus according to claim 1, wherein said first housing section includes an ocular lens assembly and said second housing section includes an objective lens assembly.

3. The sight apparatus according to claim 2, wherein said first housing section includes an adjustable zoom lens assembly.

4. The sight apparatus according to claim 1, further including a windage and elevation control means coupled to one of said first and second housing sections.

5. The sight apparatus according to claim 1, further including a battery coupled to one of said first and second sections and operative to apply a high voltage potential to said image intensifier means.

6. The sight apparatus according to claim 1, wherein said image intensifier means includes a high voltage source for applying operating potential to an image intensifier tube.

7. The sight apparatus according to claim 1, further including bracket means coupled to said first section to enable said sight apparatus to be secured to said firearm.

8. The sight apparatus according to claim 1, including means located on said intensifier module housing for varying the intensification gain.

9. The sight apparatus according to claim 1, wherein said first and second coupling means includes a first flange located at said other end of said first section and a congruent flange located at said other end of said second section to enable said first and second sections to be attached in a first mode and detached in a second mode wherein said intensifier module may be coupled therebetween.

10. The sight apparatus according to claim 1, wherein said firearm is a small type firearm of the type capable of being hand held.

11. The sight apparatus according to claim 1, wherein said image intensifier means includes a micro channel plate image intensifier.

12. The sight apparatus according to claim 1, further including focusing means coupled to said housing and operative to focus said telescopic lens assembly.

* * * * *